United States Patent
De Garavilla

(10) Patent No.: US 8,202,925 B2
(45) Date of Patent: Jun. 19, 2012

(54) GOLF BALLS WITH CORES OR INTERMEDIATE LAYERS PREPARED FROM HIGHLY-NEUTRALIZED ETHYLENE TERPOLYMERS AND ORGANIC ACIDS

(75) Inventor: James R. De Garavilla, Silsbee, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 419 days.

(21) Appl. No.: 12/471,925

(22) Filed: May 26, 2009

(65) Prior Publication Data

US 2010/0304893 A1    Dec. 2, 2010

(51) Int. Cl.
C08L 33/02 (2006.01)
C08K 5/09 (2006.01)
C08K 5/098 (2006.01)
A63B 37/00 (2006.01)

(52) U.S. Cl. ........ 524/322; 524/394; 524/397; 524/400; 525/330.2; 473/371; 473/372; 473/373

(58) Field of Classification Search ................ None
See application file for complete search history.

(56) References Cited

U.S. PATENT DOCUMENTS

| | | | |
|---|---|---|---|
| 3,264,272 A | 8/1966 | Rees | |
| 3,404,134 A | 10/1968 | Rees | |
| 3,649,578 A | 3/1972 | Bush et al. | |
| 4,209,594 A | 6/1980 | Welsh et al. | |
| 4,351,931 A | 9/1982 | Armitage | |
| 4,540,168 A | 9/1985 | Stobb | |
| 4,846,910 A | 7/1989 | Brown | |
| 4,925,193 A | 5/1990 | Melvin et al. | |
| 4,960,281 A | 10/1990 | Aoyama | |
| 4,986,545 A | 1/1991 | Sullivan | |
| 5,028,674 A | 7/1991 | Hatch et al. | |
| 5,248,878 A | 9/1993 | Ihara | |
| 5,249,804 A | 10/1993 | Sanchez | |
| 5,562,552 A | 10/1996 | Thurman | |
| 5,567,772 A * | 10/1996 | Hagman et al. | 525/221 |
| 5,575,477 A | 11/1996 | Hwang | |
| 5,688,869 A | 11/1997 | Sullivan | |
| 5,691,418 A | 11/1997 | Hagman et al. | |
| 5,789,475 A | 8/1998 | Chen | |
| 5,820,488 A | 10/1998 | Sullivan et al. | |
| 5,849,168 A | 12/1998 | Lutz | |
| 5,895,105 A | 4/1999 | Nesbitt | |
| 5,957,787 A | 9/1999 | Hwang | |
| 5,994,470 A | 11/1999 | Tanaka et al. | |
| 6,042,488 A | 3/2000 | Sullivan et al. | |
| 6,075,223 A | 6/2000 | Harrison | |
| 6,100,321 A * | 8/2000 | Chen | 524/400 |
| 6,130,296 A | 10/2000 | Yabuki et al. | |
| 6,149,535 A | 11/2000 | Bissonnette et al. | |
| 6,150,470 A | 11/2000 | Sullivan | |
| 6,277,921 B1 | 8/2001 | Sullivan | |
| 6,290,615 B1 | 9/2001 | Ogg | |
| 6,299,552 B1 | 10/2001 | Morgan et al. | |
| 6,338,684 B1 | 1/2002 | Winfield et al. | |
| 6,409,615 B1 | 6/2002 | McGuire et al. | |
| 6,433,094 B1 | 8/2002 | Nesbitt et al. | |
| 6,451,923 B1 | 9/2002 | Sullivan et al. | |
| 6,565,456 B2 | 5/2003 | Hayashi et al. | |
| 6,573,335 B1 | 6/2003 | Sullivan et al. | |
| 6,653,382 B1 | 11/2003 | Statz et al. | |
| 6,746,345 B2 | 6/2004 | Higuchi et al. | |
| 6,777,472 B1 | 8/2004 | Statz et al. | |
| 6,800,695 B2 | 10/2004 | Sullivan | |
| 6,815,480 B2 | 11/2004 | Statz et al. | |
| 6,953,820 B2 | 10/2005 | Statz et al. | |
| 7,375,151 B2 | 5/2008 | Statz et al. | |
| 2001/0018375 A1 | 8/2001 | Hayashi et al. | |
| 2001/0019971 A1 | 9/2001 | Hayashi et al. | |
| 2001/0024982 A1 | 9/2001 | Cavallaro et al. | |
| 2002/0013421 A1 | 1/2002 | Takesue et al. | |
| 2002/0061793 A1 | 5/2002 | Higuchi et al. | |
| 2002/0082358 A1 | 6/2002 | Ohira et al. | |
| 2002/0099120 A1 | 7/2002 | Takesue et al. | |
| 2002/0111407 A1 | 8/2002 | Takesue et al. | |
| 2003/0050373 A1 | 3/2003 | Chen | |
| 2003/0114565 A1 | 6/2003 | Chen | |
| 2004/0209705 A1 | 10/2004 | Rajagopalan et al. | |
| 2005/0267240 A1 * | 12/2005 | Chen | 524/322 |
| 2006/0188734 A1 | 8/2006 | Valentage et al. | |
| 2006/0189413 A1 | 8/2006 | Boehm et al. | |
| 2006/0276267 A1 | 12/2006 | Kang | |
| 2006/0293464 A1 | 12/2006 | Rajagopalan et al. | |
| 2007/0173348 A1 | 7/2007 | Rajagopalan et al. | |
| 2007/0203277 A1 * | 8/2007 | Chen | 524/322 |

FOREIGN PATENT DOCUMENTS

| | | |
|---|---|---|
| GB | 2164342 A | 3/1986 |
| WO | 9846671 A1 | 10/1998 |
| WO | 0023519 A1 | 4/2000 |
| WO | 0129129 A1 | 4/2001 |

OTHER PUBLICATIONS

U.S. Appl. No. 12/261,331, filed Oct. 30, 2008.
U.S. Appl. No. 10/078,417, filed Feb. 21, 2002.
U.S. Appl. No. 09/404,164, filed Sep. 27, 1999.
U.S. Appl. No. 10/028,826, filed Dec. 28, 2001.
U.S. Appl. No. 09/442,845, filed Nov. 18, 2000.
U.S. Appl. No. 09/842,829, filed Apr. 27, 2001.
Technical Advertisement by OK Automation 1998.
U.S. Appl. No. 09/841,910, filed Apr. 27, 2001.
U.S. Appl. No. 10/012,538, filed Dec. 12, 2001.
U.S. Appl. No. 09/739,469, filed Dec. 18, 2000.

* cited by examiner

Primary Examiner — David Buttner

(57) ABSTRACT

Described are golf balls comprising cores or intermediate layers prepared from thermoplastic compositions having coefficients of restitution equal to or greater than 0.83 and PGA compression greater than 100. Also described is a composition comprising or prepared from (a) at least one aliphatic, mono-functional organic acid having from 16 to 20 carbon atoms, wherein the organic acid is unsaturated and linear; (b) an ethylene acid copolymer consisting essentially of copolymerized comonomers of ethylene and from 18 to 24 weight % of copolymerized comonomers of at least one $C_3$ to $C_8$ $\alpha,\beta$ ethylenically unsaturated carboxylic acid, based on the total weight of the ethylene acid copolymer, having a melt index from about 200 to about 600 g/10 minutes; wherein the combined acid moieties of (a) and (b) are nominally neutralized to a level from about 120% to about 200%; and optionally (c) filler.

11 Claims, No Drawings

GOLF BALLS WITH CORES OR INTERMEDIATE LAYERS PREPARED FROM HIGHLY-NEUTRALIZED ETHYLENE TERPOLYMERS AND ORGANIC ACIDS

BACKGROUND OF THE INVENTION

1. Field of the Invention

The invention relates to golf balls with cores or intermediate layers prepared from melt-processible thermoplastic compositions comprising neutralized ethylene, $C_3$ to $C_8$ $\alpha,\beta$ ethylenically unsaturated carboxylic acid copolymers and organic acids.

2. Description of Related Art

Several patents and publications are cited in this description in order to more fully describe the state of the art to which this invention pertains. The entire disclosure of each of these patents and publications is incorporated by reference herein.

Premium golf balls include wound balls, two-piece balls and multilayered balls. Wound balls may have a spherical molded center, elastomeric thread-like material wound around the center, and either a thermoplastic or thermoset cover. Two-piece balls have a spherical molded core covered with a thin layer of thermoplastic or thermoset material. Multilayered balls have a spherical molded core, a cover, and one or more intermediate layers between the core and the cover.

Centers for wound balls and cores for two-piece and multi-layer balls have been made using a thermoset rubber such as polybutadiene rubber. With thermoset rubber, complex multistep processes are needed to make cores and centers. These processes result in scrap that is difficult to recycle. Attempts to solve these difficulties by substituting a thermoplastic for the thermoset rubber have had limited success.

Thermoplastic ionomers of copolymers of alpha olefins, particularly ethylene, and $C_{3-8}$ $\alpha,\beta$ ethylenically unsaturated carboxylic acids have found utility in golf ball components such as covers, and other applications. U.S. Pat. No. 3,264,272 teaches methods for making such ionomers. The acid copolymers on which the ionomers are based may be prepared as described in U.S. Pat. No. 4,351,931.

A wide range of cations is known for neutralizing acid moieties in the acid copolymer, including lithium, sodium, potassium, magnesium, calcium, barium, lead, tin, zinc, aluminum, and combinations of such cations and the degree of neutralization is known to vary over a wide range. Neutralization to 90% and higher, including up to 100%, is known, but such a high degree of neutralization can result in a loss of melt-processibility or properties such as elongation and toughness. This is particularly so for copolymers with high acid levels.

U.S. Pat. Nos. 5,688,869; 6,150,470; 6,277,921; 6,433,094; 6,451,923; 6,573,335 and 6,800,695 disclose compositions, and golf ball covers comprising the compositions, comprising metal cation neutralized high acid ionomer resins comprising copolymers of greater than 16% by weight of an alpha, beta-unsaturated carboxylic acid and the balance an alpha-olefin, of which about 10 to about 90% of the carboxyl groups of the copolymer are neutralized with metal cations.

Ionomers have also been modified with fatty acids. For example, U.S. Pat. No. 6,777,472 discloses a thermoplastic composition that is melt-processable consisting essentially of (a) from 20 to 45 weight percent aliphatic, mono-functional organic acid(s) having fewer than 36 carbon atoms or salt(s) thereof; and (b) ethylene, $C_3$ to $C_8$ alpha,beta ethylenically unsaturated carboxylic acid copolymer(s) or melt-processible ionomer(s) thereof, wherein greater than 90% of all the acid of (a) and (b) is neutralized by concurrently or subsequently adding to the melt blend of (a) and (b) an amount of a cation source necessary to obtain greater than 90% neutralization.

Modified ionomers have been used as golf ball components. For example, U.S. Pat. No. 6,565,456 discloses multilayer golf balls comprising a solid core, a surrounding layer, an intermediate layer and a cover, wherein at least one of the surrounding layer, the intermediate layer or the cover is formed of a heated mixture comprising (a) an olefin-carboxylic acid-optional carboxylate random copolymer and/or (d) a metal ion-neutralized olefin-carboxylic acid-optional carboxylate random copolymer; (b) a fatty acid or derivative; and (c) a neutralizing basic inorganic metal compound.

U.S. Pat. No. 6,653,382 discloses golf balls comprising a thermoplastic polymer consisting essentially of at least one of (a) E/X/Y copolymers where E is ethylene, X is a $C_3$ to $C_8$ alpha,beta ethylenically unsaturated carboxylic acid, and Y is a softening co-monomer of the E/X/Y copolymers, wherein X is about 3-30 weight % of the E/X/Y copolymer, or partially neutralized ionomers thereof, and Y is about 0-30 weight % of the E/X/Y copolymer; and (b) one or more aliphatic, monofunctional organic acids having fewer than 36 carbon atoms or salts thereof being present in the range of about 25 to about 150 parts per hundred parts by weight of the E/X/Y copolymer, wherein greater than 90% of all the acid of (a) and of (b) is neutralized with a cation source.

US Patent Application Publication 2002/0111407 discloses golf balls comprising a base resin comprising a (metal ion-neutralized) olefin-unsaturated carboxylic acid-unsaturated carboxylate ternary random copolymer and optionally a (metal ion-neutralized) olefin-unsaturated carboxylic acid binary random copolymer blended with specific proportions of a fatty acid and/or fatty acid derivative and a basic inorganic metal compound capable of neutralizing acidic groups left unneutralized in the base resin and fatty acid.

U.S. Pat. No. 6,953,820 discloses a composition, and golf balls comprising the composition, comprising a thermoplastic polymer blend which has a coefficient of restitution of at least 0.785 and an Atti compression of no more than 100, wherein the blend consists essentially of at least one (a) E/X/Y copolymers where E is ethylene, X is a mixture of at least two $C_3$ to $C_8$ alpha,beta ethylenically unsaturated carboxylic acids, and Y is a softening comonomer or ionomers of the E/X/Y copolymers wherein X is about 3-30 weight % of the E/X/Y copolymer, and Y is 0 to about 30 weight % of the E/X/Y copolymer; and (b) one or more aliphatic, monofunctional organic acids having fewer than 36 carbon atoms or salts thereof, wherein greater than 90% of all the acid of (a) and of (b) is neutralized.

It is desirable to provide a high performance material to be used in the cores, centers or intermediate layers of golf balls.

SUMMARY OF THE INVENTION

The invention provides a thermoplastic composition comprising or prepared from:

(a) at least one aliphatic, monofunctional organic acid having 4 to 36 carbon atoms, wherein the longest carbon chain of the acid is optionally substituted with from one to three substituents independently selected from $C_1$ to $C_8$ alkyl groups;

(b) at least one ethylene acid copolymer consisting essentially of copolymerized comonomers of ethylene, from about 12 to about 25 weight % of copolymerized comonomers of at least one $C_3$ to $C_8$ $\alpha,\beta$ ethylenically unsaturated carboxylic acid, and from about 0.5 to about 10 weight % of copolymerized comonomers of at least one $C_3$ to $C_8$ $\alpha,\beta$ ethylenically unsaturated carboxylic acid ester, based on the total weight of the ethylene acid copolymer, having a melt index from about 200 to about 600 g/10 minutes measured according to ASTM D1238 at 190° C. using a 2160 g weight;

wherein the combined acid moieties of (a) and (b) are nominally neutralized to a level from about 90% to about 220%; and wherein the thermoplastic composition when formed into a sphere of 1.50 to 1.68 inches in diameter has a coefficient of restitution equal to or greater than 0.86, measured by firing the sphere at an initial velocity of 125 feet/second against a steel plate positioned 3 feet from the point where initial velocity is determined and dividing the velocity of rebound from the plate by the initial velocity and has a PGA compression greater than 110.

Also provided is a golf ball comprising a core and a cover and optionally at least one intermediate layer positioned between the core and the cover, wherein the core or an intermediate layer when present comprises or is prepared from the thermoplastic composition described above.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control. Tradenames are in uppercase.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at levels that are appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "terpolymer" refers to polymers consisting essentially of three monomers.

Previously known organic acid-modified ethylene acid terpolymers may have coefficients of restitution less than 0.86 and PGA compression less than 100. It is desirable, however, to provide a composition having a higher coefficient of restitution. Accordingly, provided herein is a thermoplastic composition comprising or prepared from:

(a) at least one aliphatic, monofunctional organic acid having 4 to 36 carbon atoms;

(b) at least one ethylene acid copolymer consisting essentially of copolymerized comonomers of ethylene, from about 5 to about 18 weight % of copolymerized comonomers of at least one $C_3$ to $C_8$ $\alpha,\beta$ ethylenically unsaturated carboxylic acid, and from about 15 to about 30 weight % of copolymerized comonomers of at least one $C_3$ to $C_8$ $\alpha,\beta$ ethylenically unsaturated carboxylic acid ester, based on the total weight of the ethylene acid copolymer, having a melt index from about 30 to about 120 g/10 minutes measured according to ASTM D1238 at 190° C. using a 2160 g weight;

wherein the combined acid moieties of (a) and (b) are nominally neutralized to a level from about 80% to about 100% or to about 150%.

Acid Copolymers

The acid copolymers used to make the compositions described herein are preferably "direct" acid copolymers. In "direct" copolymers, the copolymerized monomers are part of the polymer backbone or chain. In contrast, in graft copolymers, another comonomer is attached to non-terminal repeat units in an existing polymer chain, often by a subsequent free radical reaction.

When combined with other components as described herein, an ethylene terpolymer consisting essentially of copolymerized comonomers of ethylene, about 12 to about 25 weight % of copolymerized comonomers of a $C_3$ to $C_8$ $\alpha,\beta$ ethylenically unsaturated carboxylic acid, and about 0.5 to about 10 weight % of copolymerized comonomers of a $C_3$ to $C_8$ $\alpha,\beta$ ethylenically unsaturated carboxylic acid ester having melt index flow rate of about 200 g/10 min to about 600 g/10 min or greater at 190° C. using a 2160 g weight is useful for preparing compositions with coefficients of restitution greater than 0.86, preferably greater than 0.87 or 0.88.

The terpolymer resins have melt index flow rates of about 200 g/10 min to about 600 g/10 min, or greater, at 190° C. using a 2160 g weight. Of note are terpolymer resins having melt index flow rates from about 250 g/10 min to about 400 g/10 min. Also of note are terpolymer resins having melt index flow rates from about 400 g/10 min to about 600 g/10 min.

Preferred are terpolymers and compositions comprising the terpolymers wherein the copolymerized comonomers of $C_3$ to $C_8$ $\alpha,\beta$ ethylenically unsaturated carboxylic acid are acrylic acid or methacrylic acid and the copolymerized comonomers of $C_3$ to $C_8$ $\alpha,\beta$ ethylenically unsaturated carboxylic acid esters are $C_1$-$C_4$ alkyl esters of acrylic acid or methacrylic acid. More preferred are ethylene/acrylic acid/alkyl acrylate terpolymers and ethylene/methacrylic acid/alkyl acrylate terpolymers.

Ethylene acid terpolymers with high levels of acid may be prepared by use of "co-solvent technology" as described in U.S. Pat. No. 5,028,674 or by employing somewhat higher pressures than those at which copolymers with lower acid can be prepared.

Ethylene/acrylic acid/alkyl acrylate terpolymers are of note because acrylic acid provides more acid moieties than an equal weight of methacrylic acid. Preferred are ethylene/acrylic acid/n-butyl acrylate terpolymers, including those wherein copolymerized acrylic acid comprises from 15 to 25 weight % of the terpolymer and copolymerized n-butyl acrylate comprises from 1 to 10 weight % of the terpolymer. More preferred are those wherein copolymerized acrylic acid comprises from 20 to 25 weight % and copolymerized n-butyl acrylate comprises from 1 to 5 weight %. A specific terpolymer comprises 20.8 weight % of copolymerized acrylic acid and 2.0 weight % of copolymerized n-butyl acrylate.

Of note are ethylene/methacrylic acid/n-butyl acrylate terpolymers, including those wherein copolymerized methacrylic acid comprises from 15 to 25 weight % of the terpolymer and copolymerized n-butyl acrylate comprises from 3 weight % to 10 weight % of the terpolymer.

Mixtures of terpolymers may be used, provided that the combined amounts of the comonomers of the blended terpolymers and the properties of the mixture (for example, melt index) fall within the ranges described above, such as a composition comprising a mixture of about 4 parts of a terpolymer with 20.8 weight % of copolymerized acrylic acid and 2.0 weight % of copolymerized n-butyl acrylate with MI of 474 and about 1 part of a terpolymer with 6.2 weight % of copolymerized acrylic acid and 28.0 weight % nBA with MI of 300.

Ionomers

Unmodified, melt processable ionomers may be prepared from acid copolymers described above by methods known in the art. By "unmodified", it is meant that the ionomers are not blended with any material that has been added for the purpose of modifying the properties of the unblended ionomer. Ionomers include partially neutralized acid copolymers, particularly copolymers prepared from copolymerization of ethylene and acrylic acid or methacrylic acid. The unmodified ionomers may be neutralized to any level that does not result in an intractable (not melt processible) polymer that does not have useful physical properties. Preferably, about 15 to about 90%, more preferably about 50 to about 75% of the acid moieties of the acid copolymer are neutralized to form carboxylate groups. Preferred counterions for the carboxylate groups include alkali metal cations, alkaline earth metal cations, transition metal cations, and combinations of two or more of these metal cations.

Cations useful in making the unmodified ionomers include lithium, sodium, potassium, magnesium, aluminum, calcium, barium, or zinc, or combinations of such cations. Magnesium cations or calcium cations are preferred.

Organic Acids and Salts

Suitable organic acids include, without limitation, aliphatic, monofunctional organic acids having 4 to 36 carbon atoms, optionally substituted with from one to three substituents independently selected from $C_1$ to $C_8$ alkyl groups. The organic acids may be saturated or unsaturated, and, if unsaturated, may include more than one carbon-carbon double bond. The term "monofunctional" refers to acids with one carboxylic acid moiety. The suitable organic acids include $C_4$ to $C_{36}$ (for example $C_{18}$), or $C_6$ to $C_{26}$, or $C_6$ or $C_{12}$, or $C_{16}$ to $C_{24}$ acids.

Examples of suitable organic acids include, but are not limited to, caproic acid, caprylic acid, capric acid, lauric acid, stearic acid, isostearic acid, behenic acid, erucic acid, oleic acid, iso-oleic acid, and linoleic acid. Naturally derived organic fatty acids such as palmitic, stearic, oleic, erucic, behenic acids, and mixtures thereof may also be employed.

As known in the art, commercial grades of organic acids may include a number of structurally different organic acids of varying lesser amounts. As used herein, unless otherwise specified in limited circumstances, a composition that comprises a named acid may also include other acids that are present in commercial grades of the named acid, at levels that are proportional to their levels in the commercial grade. Furthermore, when the transitional term "consisting essentially of" is applied to compositions that comprise a named acid, other acids that are present in commercial grades of the named acid, at levels that are proportional to their levels in the commercial grade, are not excluded from the composition.

Saturated acids of particular note include stearic acid and behenic acid. Saturated linear organic acids (for example stearic acid and behenic acid) are acids comprising only one $CH_3$ (methyl) and no CH (methenyl) moieties.

Unsaturated linear organic acids (for example oleic acid and erucic acid) are acids that have only one $CH_3$ moiety and at least one carbon-carbon double bond. They include any number of $CH_2$ (methylene) groups, within the carbon count limits set forth above. Monounsaturated acids contain one carbon-carbon double bond. Of note are linear, unsaturated (including multi-unsaturated) organic acids having from 16 to 24 carbon atoms, including but not limited to oleic acid, erucic acid and linoleic acid. Naturally derived organic fatty acids such as (notably) oleic acid, and mixtures thereof, may be used. Oleic acid is commercially available under tradenames INDUSTRENE 106 or INDUSTRENE 206 (PMC Biogenix of Middlebury, Conn.) or PRIOLENE 6900 or PRIOLENE 6910 (Croda Uniqema of New Castle, Del.). Erucic acid is available commercially under the trade name JARIC 22:1 from Jarchem Industries Inc. of Newark, N.J.) or as Prifrac 2990 from Uniqema of Wilton, England.

Acids wherein the longest carbon chain of the acid is substituted with from one to three $C_1$ to $C_8$ alkyl substituents, preferably methyl groups, are referred to herein as branched acids. Saturated, branched organic acids are acids comprising at least one CH (methenyl) moiety and at least two $CH_3$ (methyl) moieties. Of note are saturated, branched organic acids wherein the longest carbon chain of the acid is substituted with one $C_1$ to $C_8$ alkyl group. Also of note is a saturated, branched organic acid, preferably having from 6 to 24 carbon atoms, such as the $C_{18}$ saturated branched organic acid, "iso-stearic acid," also known as isooctadecanoic acid or 16-methyl-heptadecanoic acid.

Unsaturated branched acids are acids comprising at least one carbon-carbon double bond, at least two $CH_3$ (methyl) moieties and at least one CH (methenyl) moiety. They may include any number of $CH_2$ (methylene) groups, within the molecular weight limits set forth above. Of note are unsaturated, branched organic acids wherein the longest carbon chain of the acid is substituted with one $C_1$ to $C_8$ alkyl group. Also of note is an unsaturated, branched organic acid, preferably having from 6 to 24 carbon atoms, such as the $C_{18}$ monounsaturated methyl-branched organic acid known as "iso-oleic acid."

While it may be useful for the organic acids (and salts) to have a low volatility when being melt-blended with the acid copolymer or ionomer, volatility has been found to not be limiting when preparing blends with high nominal neutralization levels, particularly above 100%. At 100% nominal neutralization (i.e., sufficient basic compound is added such that all acid moieties in the copolymer and organic acid are nominally neutralized), or when the use of an excess of neutralizing agent results in a nominal neutralization level that is even greater than 100%, the volatility of these components is not significant. Accordingly, organic acids with lower molecular weights, such as $C_4$ and $C_6$ acids, may be used. It is preferred, however, that the organic acid (or salt) be non-volatile and non-migratory. By non-volatile, it is meant that they do not evaporate or sublime significantly at temperatures of melt blending of the acid with the acid copolymer. By non-migratory, it is meant that the acid does not bloom to the surface of the polymeric article under normal storage conditions at ambient temperatures.

Preferably the organic acids are present in about 5 weight % to about 60 weight %, and more preferably, from about 30 to about 50 weight % or from about 35 to about 46 weight % of the total weight of ionomer and organic acid salt, based on the amount of organic acid added to the composition in its non-neutralized or free-acid form.

The cations of the organic acid salts may be any of a wide variety, including the lithium, sodium, zinc, potassium, barium, bismuth, strontium, magnesium, aluminum or calcium salts of the organic acids. Magnesium salts or calcium salts are preferred.

Process for Making the Ionomer Composition

The melt-processible, modified ionomer blends may be produced by heating a mixture of the carboxylic acid copolymer(s) or ionomer(s), the organic acid(s) or salt(s) thereof, and at least one basic compound capable of neutralizing the combined acid moieties of the acid copolymer and the organic acid. For example, the components of the composition may be mixed by (a) Melt-blending ethylene α,β-ethylenically unsaturated $C_{3-8}$ carboxylic acid copolymer(s) or ionomer(s) thereof as described above that are not neutralized to a level that renders them intractable (not melt-processible) with one or more organic acids as described above or salts thereof, and concurrently or subsequently (b) Adding an amount of a basic compound capable of neutralization of the acid moieties in the acid copolymer and in the organic acid that is sufficient to achieve nominal neutralization levels of about 120% to about 200% or above.

This procedure need not employ an inert diluent such as a solvent. Treatment of acid copolymers and organic acids with basic compounds in this way enables the compositions described herein to be neutralized to a level higher than that which would result in loss of melt processibility and properties for the ionomer alone. For example, an acid copolymer blended with organic acid(s) may be nominally neutralized to a level of over 120% without losing melt processibility. Also, nominal neutralization over 120% reduces the volatility of the organic acids.

The acid copolymer(s) or unmodified, melt-processible ionomer(s) may be melt-blended with the organic acid(s) or salt(s) and other polymers in any manner known in the art. For example, a salt and pepper blend of the components may be made and then melt-blended in an extruder. The melt-processible, acid copolymer/organic-acid-or-salt blend may be treated with the basic compound by methods known in the art, such as melt-mixing. For example, a Werner & Pfleiderer twin-screw extruder may be used to mix the acid copolymer and the organic acid and treat with the basic compound at the same time. It is desirable that the mixing be conducted so that the components are intimately mixed, allowing the basic compound to neutralize the acidic moieties.

The amount of basic metal compound capable of neutralizing acidic groups in the acid copolymer and the organic acid(s) may be determined by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved. Of note are nominal neutralization levels of about 120% to about 150%, about 150% to about 180%, or about 150% to about 200%.

Suitable basic compounds include compounds of alkali metals, such as lithium, sodium or potassium, transition metal ions and/or alkaline earth metal and mixtures or combinations of such cations. They include formates, acetates, nitrates, hydrogen carbonates, carbonates, oxides, hydroxides or alkoxides of the ions of alkali metals, and formates, acetates, nitrates, oxides, hydroxides or alkoxides of the ions of alkaline earth metals and transition metals. Basic compounds with magnesium or calcium ions, such as the corresponding formate, acetate, hydroxide, oxide, alkoxide, etc.; including magnesium hydroxide, are of note.

It is desirable to run the blending/neutralization process with an extruder equipped with a vacuum port to remove any excess volatiles including moisture. Moisture may have a negative impact on subsequent molding operations in that excess moisture and volatiles may create unwanted foaming and voids in the molded article.

Of note is the composition wherein the overall salt of the composition ("overall salt" is a number of moles that is equal to the total number of moles of carboxylate anions) comprises at least about 75 equivalent % magnesium counterions or calcium counterions. While other cations may be present, the equivalent percentage of magnesium salts or calcium salts in the final blended ionomeric composition is preferably at least about 75 equivalent %, more preferably at least about 80 equivalent %, and most preferably at least about 90 equivalent % based on the total salt present in the blended composition.

The basic compound(s) may be added neat to the acid copolymer or ionomer thereof and the organic acid or salt thereof. The basic compound(s) may also be premixed with a polymeric material such as an acid copolymer, to form a "masterbatch" that may be added to the acid copolymer or ionomer thereof and the organic acid or salt thereof. A notable masterbatch comprising about 40 to 60 weight % of a copolymer of ethylene, acrylic acid or methacrylic acid, and optionally an alkyl acrylate wherein the alkyl group has from 1 to 4 carbon atoms; and about 40 to 60 weight % of a basic compound as described above (e.g., $Mg(OH)_2$). Of note are compositions comprising or prepared from (1) about 30 to about 50 weight % of at least one aliphatic, unsaturated organic acid having from 16 to 22 carbon atoms;

(2) about 30 to about 60 weight % of an ethylene acid terpolymer consisting essentially of ethylene and from 15 to 25 weight % of copolymerized comonomers of acrylic acid or methacrylic acid based on the total weight of the ethylene acid copolymer and from 1 to 10 weight % of an alkyl acrylate wherein the alkyl group has from 1 to 4 carbon atoms (such as butyl acrylate) based on the total weight of the ethylene acid copolymer, having a melt index from about 200 to about 600 g/10 minutes;

(3) about 5 to about 15 weight % of a copolymer of ethylene, 5 to 10 weight % of acrylic acid or methacrylic acid based on the total weight of the copolymer, and 15 to 30 weight % of an alkyl acrylate wherein the alkyl group has from 1 to 4 carbon atoms (such as butyl acrylate) based on the total weight of the copolymer having a melt index from about 200 to about 600 g/10 minutes; wherein the amounts of (1) and (2) and (3) based on the total weight of the composition;

wherein the combined acid moieties of (1) and (2) and (3) are nominally neutralized to a level from about 90% to about 220%.

Other Components

The compositions may additionally comprise small amounts of optional materials including additives for use in polymeric materials. Examples of suitable additives include, without limitation, plasticizers, stabilizers including viscosity stabilizers and hydrolytic stabilizers, primary and secondary antioxidants such as for example IRGANOX 1010, ultraviolet ray absorbers and stabilizers, anti-static agents, dyes, pigments or other coloring agents, fire-retardants, lubricants, processing aids, slip additives, antiblock agents such as silica or talc, release agents, and/or mixtures thereof. Additional optional additives may include inorganic fillers as described below; acid copolymer waxes, such as for example Honeywell wax AC540; $TiO_2$, which is used as a whitening agent; optical brighteners; surfactants; and other components known in the art of golf ball manufacture to be useful but not critical to golf ball performance and/or acceptance. Many such additives are described in the Kirk Othmer Encyclopedia of Chemical Technology, $5^{th}$ edition, John Wiley & Sons (Hoboken, 2005).

These additives may be present in the compositions in quantities that may be from 0.01 to 15 weight %, preferably from 0.01 to 10 weight %, or from 0.01 to 5 weight % of the total composition, so long as they do not detract from the basic and novel characteristics of the composition and do not significantly adversely affect the performance of the composition or golf ball prepared from the composition.

The optional incorporation of such conventional ingredients into the compositions may be carried out by any known process, for example, by dry blending, by extruding a mixture of the various constituents, by the conventional masterbatch technique, or the like.

Filler

Various optional fillers may be added to compositions to reduce cost, to affect rheological, mixing and physical properties such as density, flex modulus, hardness (e.g. Shore D), mold release, and/or melt flow index and the like, to increase or decrease weight, and/or to reinforce the material. The amount of filler employed is primarily a function of weight requirements and weight distribution of the golf ball. The fillers may be used to adjust the properties of a golf ball layer, reinforce the layer, or for any other purpose. For example, the compositions may be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known in the art.

Fillers may be used to modify the weight of the golf ball to meet required limits, by imparting additional density to compositions of the previously described components. Filler may be included in one or more layers of the golf ball, such as the core or intermediate layer(s), the selection being dependent upon the type of golf ball desired (i.e., two-piece, wound or multilayer), as more fully detailed below.

The filler may be inorganic, having a density from about 4 grams/cubic centimeter (g/cc), or from about 5 g/cc, to about 10 g/cc or higher and may be present in amounts between 0 and about 60 weight % based on the total weight of the composition. Preferably, enough filler is used so that the ball has an overall density of 1.14 gm/cc.

Examples of useful fillers include metals such as titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, tin oxide, titanium oxide, magnesium oxide, zinc oxide and zirconium oxide, as well as other well known corresponding salts and oxides thereof. Other preferred fillers include barium sulfate, lead silicate, tungsten carbide, limestone (ground calcium/magnesium carbonate), zinc sulfate, calcium carbonate, zinc carbonate, barium carbonate, clay, tungsten, silicas, and mixtures of any of these. Preferably the filler material is non-reactive or almost non-reactive. Of note are barium sulfate and tungsten powder fillers. Crystalline tungsten powder having a specific gravity of about 19.3 g/cc is available from Alldyne Powder Technologies, Kulite Tungsten Corporation or Buffalo Tungsten Incorporated.

Fillers may be employed in a finely divided form, for example, in a size less than about 20 mesh U.S. standard size, preferably from about 100 mesh to about 1000 mesh, except for fibers and flock, which may be elongated. Flock and fiber sizes are desirably small enough to facilitate processing. Filler particle size may depend upon desired effect, cost, ease of addition, and dusting considerations.

When filler is used in a particular composition, the coefficient of restitution (COR), as described below, will decrease roughly proportionally to the volumetric displacement of the polymer by the filler. For example, if 5 volume % of filler is used to provide a desired specific gravity, then the COR of a sphere made from the filled composition may be about 95% of the COR of a comparable sphere made from the unfilled composition. When tungsten is used as a filler with the compositions described herein, the COR of a sphere of about 1.53 inches in diameter may decrease about 0.015 to 0.020 compared to a sphere of the same size prepared from the corresponding unfilled composition, depending on the amount of tungsten that is present in the filled composition.

Of note is a thermoplastic composition comprising or prepared from:

90 to 99.9 volume %, 95 to 99.9 volume %, or 97 to 99.9 volume % of a blend comprising (a) at least one aliphatic, monofunctional organic acid having 4 to 36 carbon atoms, wherein the longest carbon chain of the acid is optionally substituted with from one to three substituents independently selected from $C_1$ to $C_8$ alkyl groups;

(b) at least one ethylene acid copolymer consisting essentially of copolymerized comonomers of ethylene, from about 12 to about 25 weight % of copolymerized comonomers of at least one $C_3$ to $C_8$ α,β ethylenically unsaturated carboxylic acid, and from about 0.5 to about 10 weight % of copolymerized comonomers of at least one $C_3$ to $C_8$ α,β ethylenically unsaturated carboxylic acid ester, based on the total weight of the ethylene acid copolymer, having a melt index from about 200 to about 600 g/10 minutes measured according to ASTM D1238 at 190° C. using a 2160 g weight;

wherein the combined acid moieties of (a) and (b) are nominally neutralized to a level from about 90% to about 200;

and further comprising 0.1 to 10, 0.1 to 3, or 0.1 to 5 volume % of filler, based on the total volume of the thermoplastic composition.

Blowing or Foaming Agents

The compositions may be foamed by the addition of at least one physical or chemical blowing or foaming agent or by blending with polymeric, ceramic, metal, and glass microspheres. The use of a foamed polymer allows the golf ball designer to adjust the density or mass distribution of the ball to adjust the angular moment of inertia, and thus, the spin rate and performance of the ball. Foamed materials also offer a potential cost savings due to the reduced use of polymeric material.

Useful blowing or foaming agents include but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., may also be injected into the composition during the injection molding process.

A foamed composition may be formed by blending microspheres with the composition either during or before the molding process. Polymeric, ceramic, metal, and glass microspheres up to about 1000 micrometers in diameter are useful, and may be solid or hollow and filled or unfilled.

Of note is an article comprising a foamed composition, such as a ball comprising a core or center prepared from the foamed composition. In addition to golf balls, such balls include baseballs and softballs. Either injection molding or compression molding may be used to form a layer or a core including a foamed polymeric material.

The compositions described herein may be injection molded or compression molded into various shaped articles, including cores or intermediate layers for golf balls as described below. For example but not limitation, injection molding conditions may include temperatures, pressures and cycle times as indicated in Table A.

TABLE A

| | Temperature (° C.) | Injection Pressure (mPa) | Cycle Times (sec) |
| --- | --- | --- | --- |
| Melt | 160-260 | Packing 25-180 | Filling and |
| Mold Front/Back | 10-30 | Hold 5-15 | Packing 40-90 |
| | | | Hold 15-30 |
| | | | Cooling Time 50-100 |
| | | | Screw Retraction 5-50 |

Golf Ball Construction

The compositions described herein may be used with any type of ball construction. It may be used in the core, cover, or one or more intermediate layers of a golf ball.

Suitable golf ball constructions, including one-piece golf balls, two-piece golf balls, three-piece golf balls and multi-piece golf balls, are described in U.S. patent application Ser. No. 12/261,331, filed on Oct. 30, 2008, and in the references cited therein. The composition described herein may be used in any of the golf balls in which the composition described in the '331 application can be used. Of note, however, are golf balls comprising a cover prepared from a polyurethane or polyurea composition, and a core or intermediate layer prepared from the composition as described herein; golf balls comprising a cover prepared from an ionomer composition, and a core or intermediate layer prepared from the composition as described herein; two-piece golf balls comprising a cover prepared from a polyurethane or polyurea composition, and a core prepared from the composition as described herein; two-piece golf balls comprising a cover prepared from an ionomer composition, and a core prepared from the composition as described herein; wound golf balls having a cover comprising or prepared from a polyurethane or polyurea composition, and a core or intermediate layer prepared from the composition as described herein; wound golf balls having a cover comprising an ionomer or prepared from an ionomer composition, and a core or intermediate layer prepared from the composition as described herein.

Also of note are multi-piece golf balls having:
1. a core comprising the composition as described herein, with or without filler, with a cover made of any composition known in the art to be useful as a cover;
2. a core comprising the composition as described herein, with or without filler, used in a multilayer golf ball core with at least one mantle, with or without filler, and a cover made of any composition known in the art to be useful as a cover;
3. a core made of any composition (including thermoset compositions such as polybutadiene rubber), with or without filler with an intermediate layer comprising the composition as described herein, with or without filler;
4. a cover prepared from a polyurethane composition; and a core prepared from the composition as described herein, further comprising at least one additional intermediate layer;
5. a cover prepared from an ionomer composition, and a core prepared from the composition as described herein, further comprising at least one additional intermediate layer;
6. a cover prepared from a polyurethane composition, and a core, further comprising at least one additional intermediate layer prepared from the composition as described herein; and
7. a cover prepared from an ionomer composition, and a core, further comprising at least one additional intermediate layer prepared from the composition as described herein.

The golf balls of note may optionally comprise one or more fillers, as described above. The filler may be used in the core and not in the mantle, in the mantle and not in the core, or in both the core and the mantle.

Furthermore, properties such as hardness, modulus, compression, resilience, core diameter, intermediate layer thickness and cover thickness of golf balls have been found to affect play characteristics such as spin, initial velocity and feel of golf balls. Depending on the construction and desired characteristics of the golf ball, the core, intermediate layers, and cover may have different resilience, compression or hardness to achieve desired performance characteristics. The compositions described herein may be useful in preparing golf balls with resilience, compression or hardness gradients within a golf ball. The selection of materials for performance based on these criteria is also described at length in U.S. patent application Ser. No. 12/261,331, filed on Oct. 30, 2008, and in the references cited therein.

In particular, however, the golf balls described herein are characterized by a high initial velocity and a high coefficient of restitution (COR). More specifically, the compositions described herein provide tailored resiliency as indicated by the coefficient of restitution (COR). Coefficient of restitution ($COR_{125}$) may be measured by firing a sphere that is 1.50 to 1.68 inches in diameter at an initial velocity of 125 feet/second against a steel plate positioned 3 feet from the point where initial velocity is determined and dividing the velocity of rebound from the plate by the initial velocity. One may also measure COR at several initial velocities, develop a correlation and determine a COR at a specified initial velocity based on the correlation. COR may be determined on a sphere prepared from a single composition or a sphere having two or more layers (for example, a finished golf ball). One skilled in the art will recognize that COR cannot be greater than 1.0.

The compositions described herein are highly resilient, that is, they exhibit high COR values. For spheres prepared from the composition without filler, the compositions provide COR measurements from about 0.86 to about 0.90 or higher when measured according to the COR Method described herein. Any COR value within that range may be considered as "high COR". As indicated above, the presence of filler reduces the COR roughly proportional to the reduction in volume of the resin fraction of the volume of a test sphere. Compositions described herein, when containing filler, have COR of greater than about 0.83, for example from about 0.83 to about 0.86, or higher.

For a solid test sphere prepared from a single composition, the COR will depend on a variety of characteristics of the composition, including its hardness. COR will generally increase as hardness is increased. In a two-piece solid golf ball with a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

Moreover, the compositions described herein have a Shore D hardness of at least about 30, and preferably about 40 to 60, as measured on a formed sphere. The compositions preferably have a Shore D hardness of about 50 to 65, as measured on a standard test plaque. In addition, the compositions described herein preferably have a flexural modulus of about 15,000 psi to about 30,000 psi.

The thermoplastic compositions described herein may be useful in a wide range of objects other than, mantles, intermediate layers, cores, and centers of golf balls. As previously discussed, the compositions, and optionally foamed compositions, may be used as cores for balls other than golf balls. The compositions also may be useful in other sporting equipment applications, particularly in golf shoe cleats, components of golf clubs such as golf club face plates or inserts, molded golf club heads, club head coatings or casings, and fillers for inner cavity of a golf club head, and the like. The compositions may also be used in place of materials taught in the art for use in club faces, such as poly-imides reinforced with fillers or fibers, methyl (meth)acrylate copolymers, carbon-fiber reinforced polycarbonate, materials based on PMMA and crosslinkable monomers, and cross-linked synthetic rubber. The composition may also be substituted for the cured acrylic monomer, oligomer, polymer used to impregnate wood club heads, for rubber-like elastic cores in club heads, and for molded polyurethane club heads. As such, golf club heads may be prepared having a front striking face adapted to strike a ball and an insert mounted on the striking face, said insert comprising a molded article comprising the composition above. In addition, golf club heads comprising a metal body and an insert plate secured to the forward striking surface of the metal body and made of the composition above laminated with an outer metal layer formed with grooves. In addition, this invention also includes a golf club having a shaft with a club head affixed to the shaft, wherein the club head is described above, having a component comprising the composition above.

The composition may also be useful for preparing molded articles that are footwear structural components, provide shape support for footwear construction, such as heel counters, toe puffs, soles and cleats. "Heel counter" as used herein refers to a stiff, curved piece that provides shape and structure to the heel area of a shoe. "Toe puff" or "toe box" as used herein refers to a stiff, arched piece that provides shape and structure to the toe area of a shoe. "Sole" as used herein refers to a stiff, generally flat piece that provides shape and structure to the bottom of a shoe. These structural components may be incorporated into the internal structure of the shoe and covered with additional components for wear and/or appearance.

The composition described herein may also be useful in non-sporting good applications such as caulking materials, sealants, modifiers for cement and asphalt, and coatings. The compositions may also be useful in toys, decorative objects, and containers for inert materials.

The following examples are provided to describe the invention in further detail. These examples, which set forth a preferred mode presently contemplated for carrying out the invention, are intended to illustrate and not to limit the invention.

EXAMPLES

Testing Criteria for Examples

Coefficient of Restitution (COR) was measured by firing an injection-molded neat sphere of the resin having the size of a golf ball from an air cannon at several velocities over a range of roughly 60 to 180 fps. The spheres struck a steel plate positioned three feet away from the point where initial velocity is determined, and rebounded through a speed-monitoring device located at the same point as the initial velocity measurement. The COR of each measurement was determined as the ratio of rebound velocity to initial velocity. The individually determined COR measurements were plotted as a function of initial velocity, and COR at 125 fps (i.e. $COR_{125}$) was determined by linear regression.

As used in the Examples below, melt index (MI) refers to melt index as determined according to ASTM D1238 at 190° C. using a 2160 g weight, with values of MI reported in g/10 minutes.

As used herein, "Shore D hardness" of a material is measured generally in accordance with ASTM D-2240 either on a plaque or on the curved surface of a molded sphere. Shore D hardness of multilayer spheres is measured with all layers present. When a hardness measurement is made on a dimpled sphere, Shore D hardness is measured at a land area of the dimpled sphere.

Flex Modulus was measured according to ASTM D790, Method 1, Procedure A, employing a 3-point test fixture with a 2-inch span length and a crosshead speed of 0.50 inches/minute. The method provides a measurement of the Tangent Modulus of Elasticity (3-Point Flex Modulus).

PGA Compression was measured using an "Atti" testing device according to standard procedures for that instrument. For accurate comparison of compression data, the diameter of the balls was corrected to 1.68 inch diameter using accepted methods, such as shimming.

Materials Used:

EAC-1: An ethylene/acrylic acid (AA)/n-butyl acrylate (nBA) terpolymer with 12 weight % of AA and 17.6 weight % of nBA, with an MI of 95.

EAC-2: A 50/50 blend by weight of an ethylene/AA/nBA terpolymer with 20.5 weight % of AA and 4.0 weight % of nBA, with an MI of about 750 with an ethylene/AA copolymer with 21.0 weight % of AA and an MI of 300.

EAC-3: An ethylene/AA/nBA terpolymer with 10.5 weight % of AA and 15.5 weight % of nBA, with an MI of 60.

EAC-4: An ethylene/AA/nBA terpolymer with 6.2 weight % of AA and 28.0 weight % of nBA, with an MI of 60.

EAC-5: An ethylene/acrylic acid/nBA terpolymer with 6.2 weight % of AA and 28.0 weight % of nBA, with an MI of 300.

EAC-7: An ethylene/MAA/nBA terpolymer with 19.5 weight % of MAA and 4.0 weight % of nBA, with an MI of 265.

EAC-8: An ethylene/MAA/nBA terpolymer with 17.5 weight % of MAA and 8.0 weight % of nBA, with an MI of 280.

EAC-9: An ethylene/AA/nBA terpolymer with 17.6 weight % of AA and 4.0 weight % of nBA, with an MI of 285.

EAC-10: An ethylene/AA/nBA terpolymer with 15.4 weight % of AA and 8.0 weight % of nBA, with an MI of 300.

EAC-11: An ethylene/AA/nBA terpolymer with 21.3 weight % of AA and 2.0 weight % of nBA, with an MI of 275.

EAC-12: An ethylene/AA/nBA terpolymer with 21.4 weight % of AA and 4.0 weight % of nBA, with an MI of 275.

MB-1: A $Mg(OH)_2$ concentrate with 49 weight % $Mg(OH)_2$ in EAC-5.

Oleic acid was a commercial grade material obtained from Chemtura Industries of Middlebury, Conn., under the tradename INDUSTRENE 106.

Erucic acid was obtained as JARIC 22:1 from Jarchem Industries Inc. of Newark, N.J. or as Prifrac 2990 from Uniqema of Wilton, England.

Filler: crystalline tungsten powder available from Alldyne Powder Technologies, Kulite Tungsten Corporation, with a specific gravity of 19.3 g/cc.

Blends were prepared according to the following general procedure. Employing a Werner & Pfleiderer twin screw extruder, organic acid, an ethylene acid copolymer, and neutralizing agent (MB-1 and/or $Mg(OH)_2$ were melt blended. The amounts of the acid and copolymer were added so that the resulting blend contained 25 to 45 weight % of the organic acid. The blend was treated with sufficient MB-1 and/or $Mg(OH)_2$ so that the acid moieties of the organic acid and the acid copolymer were nominally neutralized to the level indicated.

General extrusion conditions for making the blends identified in Table 2 are shown in Table 1.

TABLE 1

| | Zone 1 | Zone 2-4 | Zone 5 | Die | Melt |
|---|---|---|---|---|---|
| Temperature ° C. | 140-180 | 265-275 | 255-265 | 200-220 | 255-275 |
| Vacuum inches | 28 | | | | |
| Screw Speed rpm | 175-250 | | | | |
| Total rate (lb/h) | 15-25 | | | | |

The components of the blends are summarized in Table 2. In the column labeled "Organic Acid Type," "100 O" indicates that the organic acid was 100% of an as-obtained commercial grade of oleic acid, and "50 O/50 E" indicates that the organic acids were as-obtained commercial grades of oleic acid and erucic acid in a 50/50 ratio by weight. The column labeled "$Mg(OH)_2$" shows the amount of $Mg(OH)_2$ calculated to be present in the composition based on the amount of MB-1 masterbatch included in the composition.

Comparative Examples C1 and C2 are blends comprising ethylene terpolymer with lower amounts of acrylic acid and higher amounts of n-butyl acrylates with a lower MI, neutralized with MB-1, prepared using procedures similar to those used for the Examples. Comparative Example C3 is a blend prepared from EAC-5, a terpolymer comprising low amounts of acrylic acid and high amounts of n-butyl acrylate with a high MI, nominally neutralized to about 115% with $Mg(OH)_2$.

TABLE 2

| Example | Terpolymer used | Organic Acid Type | Weight % | | | |
|---|---|---|---|---|---|---|
| | | | Terpolymer | Acid | MB-1 | Mg(OH)$_2$ |
| C1 | EAC-3 | 100 O | 52.55% | 35.00% | 12.45% | 6.10% |
| C2 | EAC-4 | 100 O | 50.10% | 35.00% | 14.90% | 7.30% |
| C3* | EAC-5 | 100 O | 45% | 35% | 0 | n/a |
| 1 | EAC-2 | 100 O | 44.0% | 36.70% | 19.3% | 9.5% |
| 2 | EAC-11 | 50 O/50 E | 43.37% | 40.48% | 16.15% | 7.92% |
| 3 | EAC-11 | 50 O/50 E | 37.21% | 43.99% | 18.80% | 9.21% |
| 4 | EAC-11 | 100 O | 52.58% | 30.67% | 16.75% | 8.21% |
| 5 | EAC-11 | 100 O | 42.60% | 40.30% | 17.10% | 8.38% |
| 6 | EAC-7 | 100 O | 50.43% | 29.47% | 20.10% | 9.85% |
| 7 | EAC-7 | 100 O | 48.42% | 32.18% | 19.40% | 9.51% |
| 8 | EAC-7 | 100 O | 41.17% | 38.65% | 20.18% | 9.89% |
| 9 | EAC-7 | 100 O | 35.76% | 38.08% | 26.16% | 12.82% |
| 10 | EAC-12 | 100 O | 52.38% | 31.63% | 15.99% | 7.84% |
| 11 | EAC-12 | 100 O | 40.85% | 41.92% | 17.23% | 8.44% |
| 12 | EAC-12 | 100 O | 45.46% | 34.29% | 20.25% | 9.92% |
| 13 | EAC-12 | 50 O/50 E | 44.70% | 39.31% | 15.99% | 7.83% |
| 14 | EAC-9 | 100 O | 52.02% | 30.53% | 17.45% | 8.55% |
| 15 | EAC-9 | 100 O | 52.61% | 32.10% | 15.29% | 7.49% |
| 16 | EAC-9 | 100 O | 44.14% | 40.09% | 15.76% | 7.72% |
| 17 | EAC-9 | 100 O | 47.75% | 30.96% | 21.29% | 10.43% |
| 18 | EAC-9 | 100 O | 40.65% | 39.56% | 19.78% | 9.69% |
| 19 | EAC-8 | 100 O | 51.18% | 30.82% | 18.00% | 8.82% |
| 20 | EAC-8 | 100 O | 51.13% | 29.41% | 19.47% | 9.54% |
| 21 | EAC-8 | 100 O | 41.86% | 36.84% | 21.30% | 10.44% |
| 22 | EAC-8 | 100 O | 34.24% | 38.19% | 27.56% | 13.51% |
| 23 | EAC-10 | 100 O | 54.66% | 29.94% | 15.41% | 7.55% |
| 24 | EAC-10 | 100 O | 40.86% | 39.77% | 19.36% | 9.49% |
| 25 | EAC-10 | 100 O | 44.12% | 36.48% | 19.39% | 9.50% |
| 26 | EAC-1 | 100 O | 54.81% | 36.54% | 0.00% | 8.7% |
| C29 | EAC-3 | 100 O | 50.96% | 34.92% | 14.11% | 6.59% |
| C30 | EAC-3 | 100 E | 47.90% | 39.27% | 12.82% | 6.24% |
| C31 | EAC-4 | 100 O | 51.70% | 34.95% | 13.35% | 6.54% |
| C32 | EAC-4 | 100 E | 47.69% | 39.76% | 12.55% | 5.96% |

*Amounts in C3 are targeted amounts; "n/a" means "not available".

In Table 3, the column labeled "Adjusted Base Resin MI" indicates the MI calculated from a weighted logarithmic average of the non-neutralized mixture of terpolymers present in the composition according to the following formula:

$$MI_{polymer1}^{fraction1} \times MI_{polymer2}^{fraction2} \times \ldots \times MI_{polymerN}^{fractionN}$$

wherein fraction1+fraction2+ . . . +fractionN+100%

"% Nominal Neutralization" is calculated by stoichiometric principles based on the total amount of acid groups present in the terpolymer(s) and the organic acid(s), and on the amount of Mg(OH)$_2$ added to the thermoplastic composition. The total amount of acid groups includes the acid groups in the polymer carrier in the masterbatch, if a masterbatch was used.

"Measured MI" is the melt index of the composition after blending.

TABLE 3

| Example | Adjusted Base Resin MI | % Nominal Neutralization | Measured MI |
|---|---|---|---|
| C1 | 71 | 102% | 1.00 |
| C2 | 74 | 145% | 1.00 |
| C3 | 300 | 115%* | n/a** |
| 1 | 437 | 124% | 0.06 |
| 2 | 279 | 103% | 0.29 |
| 3 | 280 | 123% | 0.34 |
| 4 | 278 | 105% | 0.01 |
| 5 | 279 | 105% | 0.37 |
| 6 | 270 | 150% | 0.31 |
| 7 | 270 | 142% | 0.89 |
| 8 | 271 | 143% | 2.58 |
| 9 | 274 | 195% | 0.93 |

TABLE 3-continued

| Example | Adjusted Base Resin MI | % Nominal Neutralization | Measured MI |
|---|---|---|---|
| 10 | 278 | 99% | 0.17 |
| 11 | 279 | 105% | 0.48 |
| 12 | 279 | 134% | 0.06 |
| 13 | 279 | 102% | 0.25 |
| 14 | 287 | 122% | 0.16 |
| 15 | 287 | 104% | 0.46 |
| 16 | 287 | 104% | 1.12 |
| 17 | 288 | 154% | 0.01 |
| 18 | 288 | 135% | 0.35 |
| 19 | 283 | 138% | 2.21 |
| 20 | 283 | 152% | 0.01 |
| 21 | 284 | 160% | 6.85 |
| 22 | 286 | 215% | 4.55 |
| 23 | 300 | 114% | 0.29 |
| 24 | 300 | 138% | 0.75 |
| 25 | 300 | 142% | 0.21 |
| 26 | 95 | 135% | 0.35 |
| C29 | 73 | 124% | 0.91 |
| C30 | 72 | 127% | 1.43 |
| C31 | 72 | 124% | 2.63 |
| C32 | 72 | 121% | 5.94 |

*Amounts in C3 are targeted amounts.
*"n/a" means "not available".

Thermoplastic Spheres

The compositions were molded into spheres 1.53 to 1.55 inches in diameter using the molding conditions for making spheres that are shown in Table 4. General molding conditions are reported as ranges, with specific conditions for selected examples indicated. The results obtained by measuring the example spheres are summarized in Table 5.

TABLE 4

Molding Conditions for Spheres

| Example | Melt Zone (°C.) | Mold (°C.) | Inject (s) | Fill (s) | Pack (s) | Pack (mPa) | Cool (s) |
|---|---|---|---|---|---|---|---|
| General | 190-230 | 20-50 | 80-90 | 10-30 | 55-75 | 50-160 | 75-80 |

TABLE 5

| Example | Weight (g) | Diameter (in) | Sp.Gr. (g/cc) | Shrink (%) |
|---|---|---|---|---|
| C1 | 30.669 | 1.5393 | 0.980 | 3.11% |
| C2 | 30.443 | 1.5355 | 0.980 | 3.35% |
| C3 | — | — | — | — |
| 1 | 31.430 | 1.5431 | 0.997 | 2.87% |
| 2 | 29.838 | 1.530 | 0.963 | 3.70% |
| 3 | 30.142 | 1.537 | 0.970 | 3.28% |
| 4 | 31.285 | 1.543 | 0.986 | 2.86% |
| 5 | 31.320 | 1.545 | 0.988 | 2.76% |
| 6 | 31.579 | 1.549 | 0.991 | 2.51% |
| 7 | 31.377 | 1.549 | 0.983 | 2.50% |
| 8 | 30.950 | 1.541 | 0.983 | 2.98% |
| 9 | 31.464 | 1.539 | 1.001 | 3.11% |
| 10 | 31.296 | 1.540 | 0.998 | 3.07% |
| 11 | 31.030 | 1.539 | 0.992 | 3.15% |
| 12 | 30.674 | 1.542 | 0.976 | 2.91% |
| 13 | 29.964 | 1.531 | 0.972 | 3.60% |
| 14 | 31.289 | 1.551 | 0.993 | 2.37% |
| 15 | 31.142 | 1.546 | 0.978 | 2.67% |
| 16 | 30.947 | 1.545 | 0.974 | 2.77% |
| 17 | 31.042 | 1.543 | 0.982 | 2.88% |
| 18 | 30.923 | 1.538 | 0.988 | 3.17% |
| 19 | 30.766 | 1.536 | 0.985 | 3.30% |
| 20 | 31.396 | 1.549 | 0.989 | 2.53% |
| 21 | 31.050 | 1.536 | 0.999 | 3.30% |
| 22 | 31.386 | 1.535 | 1.010 | 3.36% |
| 23 | 30.957 | 1.543 | 0.981 | 2.87% |
| 24 | 31.182 | 1.543 | 0.991 | 2.88% |
| 25 | 30.050 | 1.535 | 0.967 | 3.36% |
| 26 | 30.700 | 1.5382 | 0.988 | 3.18% |
| C29 | 30.550 | 1.561 | 0.936 | 1.75% |
| C30 | 30.425 | 1.563 | 0.929 | 1.63 |
| C31 | 30.743 | 1.565 | 0.935 | 1.50% |
| C32 | 30.478 | 1.564 | 0.928 | 1.54% |

Examples C1 was also filled with tungsten filler and molded into spheres as summarized in Table 6. The amount of tungsten was between 15 and 20 weight %, based on the total weight of the thermoplastic composition, or about 0.75 to 1.25 volume % of tungsten based on the total volume of the thermoplastic composition. "PBR" is a conventional filled thermoset polybutadiene rubber core for comparison.

TABLE 6

| Example | Resin Used | Weight (g) | Diameter (in) | Specific Gravity (g/cc) | Shrink (%) |
|---|---|---|---|---|---|
| C4 | C1 | 36.803 | 1.550 | 1.151 | 2.47% |
| PBR | — | 37.158 | 1.5516 | 1.158 | 2.34% |

The spheres were tested for Coefficient of Restitution, PGA Compression and Shore D Hardness. The results are reported in Table 7.

TABLE 7

| Example | COR$_{125}$ | PGA Compression | Shore D |
|---|---|---|---|
| C1 | 0.859 | 101.0 | 45.8 |
| C2 | 0.826 | 74.6 | 41.8 |
| C3 | na | na | na |
| 1 | 0.880 | 126.7 | 59.6 |
| 2 | 0.886 | 123.5 | 55.3 |
| 3 | 0.889 | 117.7 | 51.5 |
| 4 | 0.884 | 141.2 | 58.1 |
| 5 | 0.889 | 131.4 | 54.5 |
| 6 | 0.835 | 121.7 | 53.6 |
| 7 | 0.835 | 115.2 | 52.6 |
| 8 | 0.853 | 110.8 | 49.7 |
| 9 | 0.853 | 112.2 | 48.2 |
| 10 | 0.866 | 139.5 | 59.1 |
| 11 | 0.888 | 126.6 | 53.3 |
| 12 | 0.872 | 130.6 | 57.0 |
| 13 | 0.884 | 123.3 | 55.1 |
| 14 | 0.865 | 123.3 | 54.2 |
| 15 | 0.866 | 125.0 | 52.7 |
| 16 | 0.882 | 115.9 | 49.5 |
| 17 | 0.862 | 120.8 | 58.1 |
| 18 | 0.880 | 119.8 | 50.7 |
| 19 | 0.828 | 106.9 | 47.3 |
| 20 | 0.842 | 111.6 | 51.1 |
| 21 | 0.844 | 101.7 | 46.8 |
| 22 | 0.847 | 103.9 | 47.0 |
| 23 | 0.870 | 116.9 | 53.6 |
| 24 | 0.875 | 110.6 | 48.3 |
| 25 | 0.875 | 101.2 | 49.6 |
| 26 | 0.868 | 117.8 | 47.7 |
| C29 | 0.850 | 82.4 | 45.2 |
| C30 | 0.850 | 74.6 | 42.4 |
| C31 | 0.807 | 51.1 | 35.8 |
| C32 | 0.805 | 41.2 | 33.6 |
| Filled Compositions | | | |
| C4 | 0.839 | 87.5 | 44.8 |
| PBR | 0.692 | 65.0 | 40.2 |

While certain preferred embodiments of the invention have been described and specifically exemplified above, it is not intended that the invention be limited to such embodiments. Various modifications may be made without departing from the scope and spirit of this invention, as set forth in the following claims.

What is claimed is:

1. A thermoplastic composition comprising or prepared from:
   (a) at least one aliphatic, monofunctional organic acid having 4 to 36 carbon atoms, wherein the longest carbon chain of the acid is optionally substituted with from one to three substituents independently selected from $C_1$ to $C_8$ alkyl groups;
   (b) at least one ethylene acid copolymer consisting essentially of copolymerized comonomers of ethylene, from about 12 to about 25 weight % of copolymerized comonomers of acrylic acid, and from about 0.5 to about 10 weight % of copolymerized comonomers of at least one alkyl acrylate, based on the total weight of the ethylene acid copolymer, said at least one ethylene acid copolymer having a melt index from about 200 to about 600 g/10 minutes measured according to ASTM D1238 at 190° C. using a 2160 g weight;
   wherein the combined acid moieties of (a) and (b) are nominally neutralized to a level from about 120% to about 220%; and
   wherein the thermoplastic composition when formed into a sphere of 1.50 to 1.68 inches in diameter has a coefficient of restitution equal to or greater than 0.86, measured by firing the sphere at an initial velocity of 125 feet/second against a steel plate positioned 3 feet from the point where initial velocity is determined and dividing the velocity of rebound from the plate by the initial velocity and has a PGA compression greater than 110.

2. The composition of claim 1 wherein the amount of the at least one organic acid is from about 35 to about 45 weight %, based on the total weight of the thermoplastic composition.

3. The composition of claim 1 wherein the at least one organic acid comprises a linear, unsaturated organic acid having from 16 to 24 carbon atoms.

4. The composition of claim 1 wherein the at least one organic acid comprises oleic acid.

5. The composition of claim 1 wherein copolymerized acrylic acid comprises from 15 to 25 weight % of the copolymer and copolymerized n-butyl acrylate comprises from 1 to 10 weight % of the copolymer.

6. The composition of claim 1 further comprising one or more fillers.

7. The composition of claim 1 that is foamed by the addition of at least one physical or chemical blowing or foaming agent or by blending with polymeric, ceramic, metal, and glass microspheres.

8. An article comprising the composition of claim 7.

9. The composition of claim 1 wherein the combined acid moieties of (a) and (b) are nominally neutralized to a level from about 120% to about 200.

10. The composition of claim 1 wherein copolymerized acrylic acid comprises from 20 to 25 weight % and copolymerized n-butyl acrylate comprises from 1 to 5 weight % of the copolymer.

11. The composition of claim 1 wherein the coefficient of restitution is greater than 0.88.

* * * * *